United States Patent
Lim et al.

(10) Patent No.: US 10,129,891 B2
(45) Date of Patent: Nov. 13, 2018

(54) METHOD FOR DETERMINING A TRANSMISSION POWER OF A VEHICLE TO EVERYTHING (V2X) SIGNAL AND A TERMINAL PERFORMING THE METHOD

(71) Applicant: LG ELECTRONICS INC., Seoul (KR)

(72) Inventors: Suhwan Lim, Seoul (KR); Sangwook Lee, Seoul (KR); Dongik Lee, Seoul (KR); Jongkil Shin, Seoul (KR); Yoonoh Yang, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/671,806

(22) Filed: Aug. 8, 2017

(65) Prior Publication Data

US 2018/0049207 A1    Feb. 15, 2018

Related U.S. Application Data

(60) Provisional application No. 62/372,789, filed on Aug. 9, 2016, provisional application No. 62/416,708, filed on Nov. 3, 2016.

(51) Int. Cl.
  *H04W 72/04* (2009.01)
  *H04W 52/36* (2009.01)
  *H04W 72/02* (2009.01)
  *H04W 24/02* (2009.01)

(52) U.S. Cl.
  CPC ..... *H04W 72/0473* (2013.01); *H04W 52/367* (2013.01); *H04W 72/0413* (2013.01); *H04W 72/0453* (2013.01); *H04W 24/02* (2013.01); *H04W 72/02* (2013.01)

(58) Field of Classification Search
  CPC . H04W 72/0453; H04W 24/02; H04W 4/046; H04W 52/367; H04W 72/02; H04W 72/0413; H04W 72/0446; H04W 72/0473
  See application file for complete search history.

(56) References Cited

U.S. PATENT DOCUMENTS

| | | | | |
|---|---|---|---|---|
| 2010/0234071 | A1* | 9/2010 | Shabtay | H04B 7/0408 455/562.1 |
| 2016/0366598 | A1* | 12/2016 | Gallagher | G08G 1/161 |
| 2018/0027563 | A1* | 1/2018 | Nguyen | H04L 5/003 |

* cited by examiner

*Primary Examiner* — Charles Appiah
*Assistant Examiner* — Margaret G Mastrodonato
(74) *Attorney, Agent, or Firm* — Birch, Stewart, Kolasch & Birch, LLP

(57) ABSTRACT

There is provided a method for determining a transmission power of a vehicle to everything (V2X) signal. The method is performed by a V2X terminal and comprises determining the transmission power of the V2X signal. The transmission power is determined based on antenna gain and a conducted power. The conducted power is determined to not exceed a specific maximum power class, The antenna gain is at most 6 dBi, and the specific maximum power class specify at most 26 dBm.

9 Claims, 11 Drawing Sheets

METHOD FOR DETERMINING A TRANSMISSION POWER OF A VEHICLE TO EVERYTHING (V2X) SIGNAL AND A TERMINAL PERFORMING THE METHOD

CROSS REFERENCE TO RELATED APPLICATIONS

This application claims the benefit of priority of U.S. Provisional Application Nos. 62/372,789 filed on Aug. 9, 2016 and No. 62/416,708 filed on Nov. 3, 2016, all of which are hereby expressly incorporated by reference into the present application.

BACKGROUND OF THE INVENTION

Field of the Invention

The present invention relates to mobile communication.

Discussion of the Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, 3GPP LTE-A (LTE-Advanced) evolved from 3GPP LTE has been commercialized.

Meanwhile, Device-to-device (D2D) communication is a distributed communication technique in which adjacent wireless nodes directly deliver traffic. In the D2D communication, a wireless node such as a mobile phone autonomously discovers another wireless node which is physically adjacent, establishes a communication session, and thereafter transmits traffic.

D2D communication, such as Bluetooth (Bluetooth) or WiFi Direct supports direct communication between the wireless nodes without the support of the base station. Further, it is also possible that communication D2D scheduling is managed by the base station for D2D communication. Thus, D2D communication managed by the base station to spread traffic from concentrating in the base station can reduce the traffic overload problem.

The above-mentioned D2D communication can also be applied to vehicle-to-everything (V2X). V2X collectively refers to communication technology through vehicles and all interfaces. Implementations of V2X may be, for example, vehicle-to-vehicle (V2V), vehicle-to-infrastructure (V2I), vehicle-to-person (V2P), vehicle-to-network (V2N), and the like.

On the other hand, since the vehicle has no restriction on the battery unlike the wireless terminal, there is a need for higher power transmission compared to the wireless terminal. Accordingly, a standard for transmitting high power in V2X communication is required.

SUMMARY OF THE INVENTION

Accordingly, a disclosure of the present specification has been made in an effort to solve the aforementioned problem.

In accordance with an embodiment of the present invention, provided is a method for determining a transmission power of a vehicle to everything (V2X) signal. The method may be performed by a V2X terminal and may comprise determining the transmission power of the V2X signal, and herein the transmission power is determined based on antenna gain and a conducted power. The conducted power may be determined to not exceed a specific maximum power class. The antenna gain may be at most 6 dBi, and the specific maximum power class specify at most 26 dBm.

The transmission power may be defined at Evolved Universal Terrestrial Radio Access (E-UTRA) band 47.

The transmission power may be at most 33 dBm.

The specific maximum power class may be power class 2.

The antenna gain may be always positive.

The transmission power may be Equivalent Isotropic Radiated Power (EIRP) of the terminal.

In accordance with another embodiment of the present invention, provided is a terminal configured to aggregate a plurality of downlink carriers and two uplink carriers for transmitting/receiving a signal. The terminal may include a transmitter configured to transmit an uplink signal through the uplink carriers. The terminal may include a receiver configured to receive a downlink signal through the plurality of downlink carriers. The terminal may include a processor configured to control the transmitter In accordance with another embodiment of the present invention, provided is a terminal supporting vehicle to everything (V2X) communication. The terminal may comprise a radio frequency (RF) unit configured to transmit a V2X signal, and a processor configured to determine a transmission power of the V2X signal. The transmission power may be determined based on antenna gain and a conducted power. The conducted power may be determined to not exceed a specific maximum power class. The antenna gain may be at most 6 dBi, and the specific maximum power class specify at most 26 dBm.

According to a disclosure of the present invention, the above problem of the related art is solved.

DETAILED DESCRIPTION OF THE EMBODIMENTS

Figure 1:
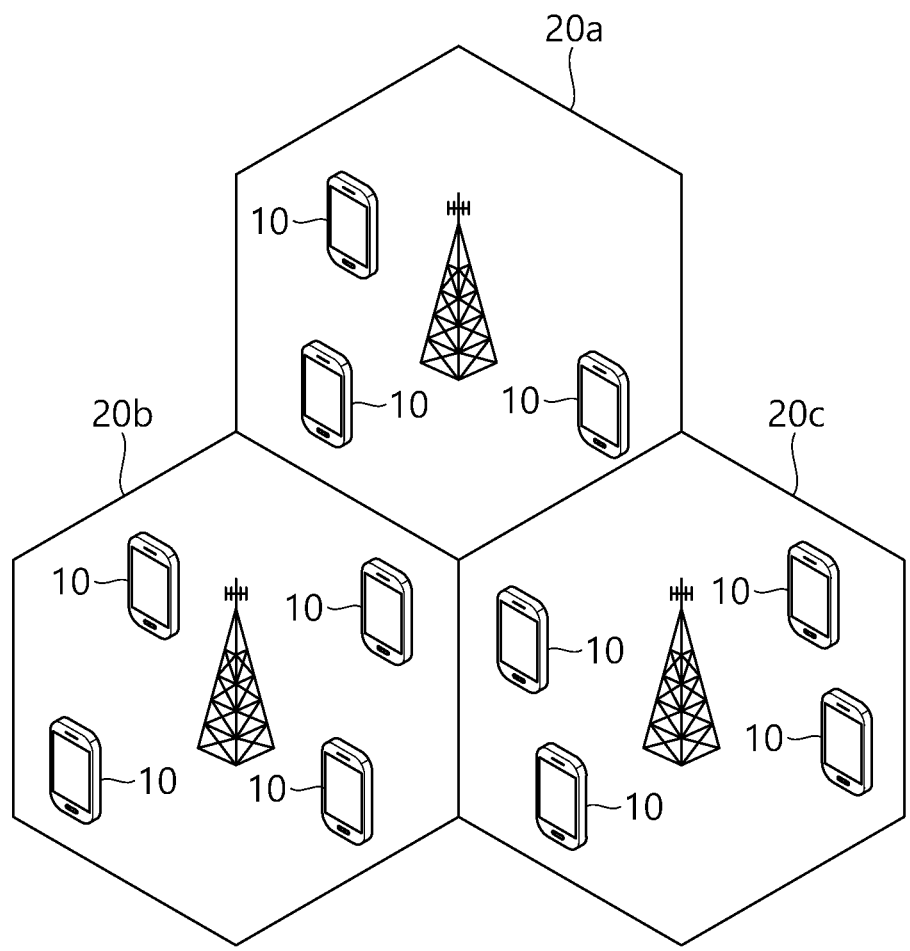
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
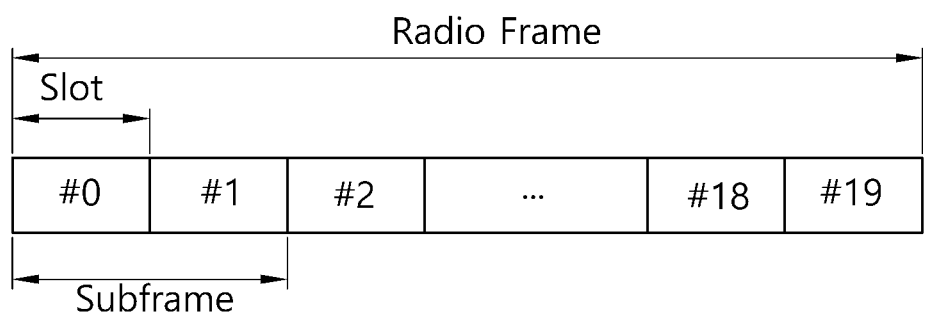
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
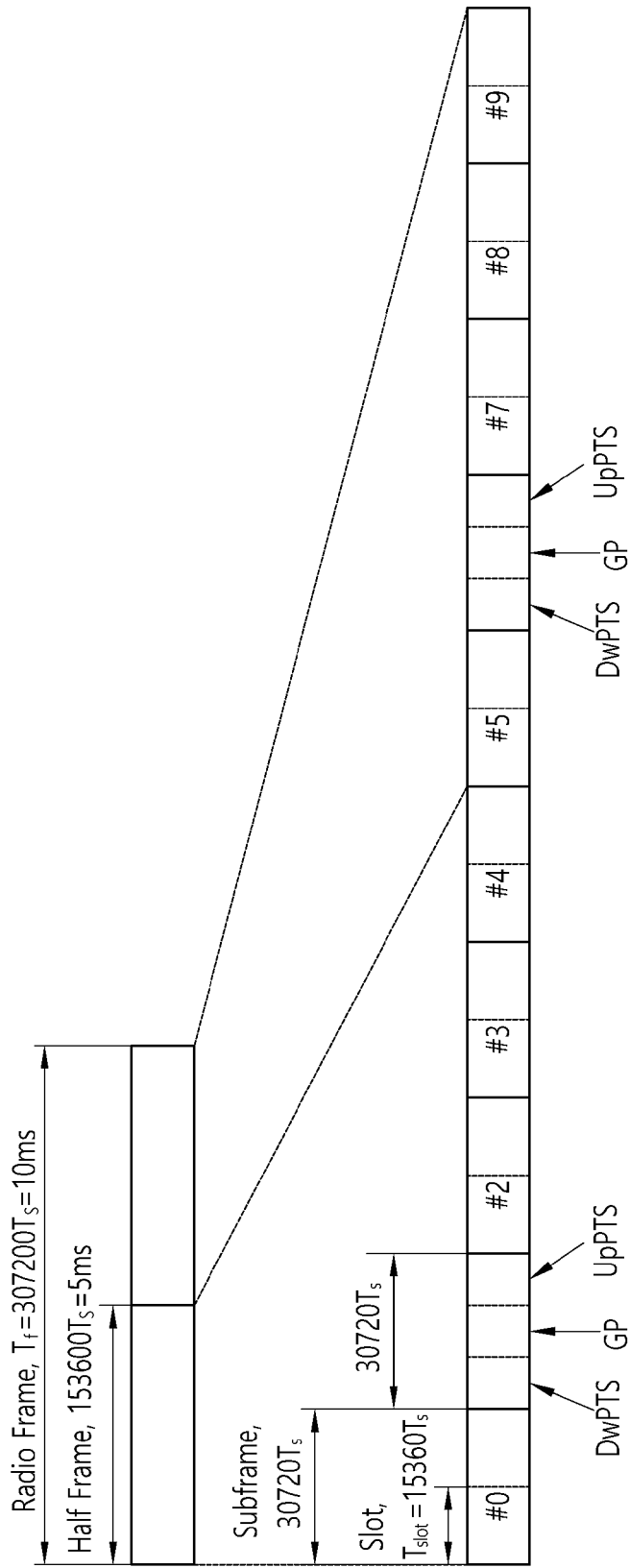
FIG. 3 illustrates a structure of a downlink radio frame according to TDD in the 3GPP LTE.

FIG. 3 illustrates the architecture of a downlink radio frame according to TDD in 3GPP LTE.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
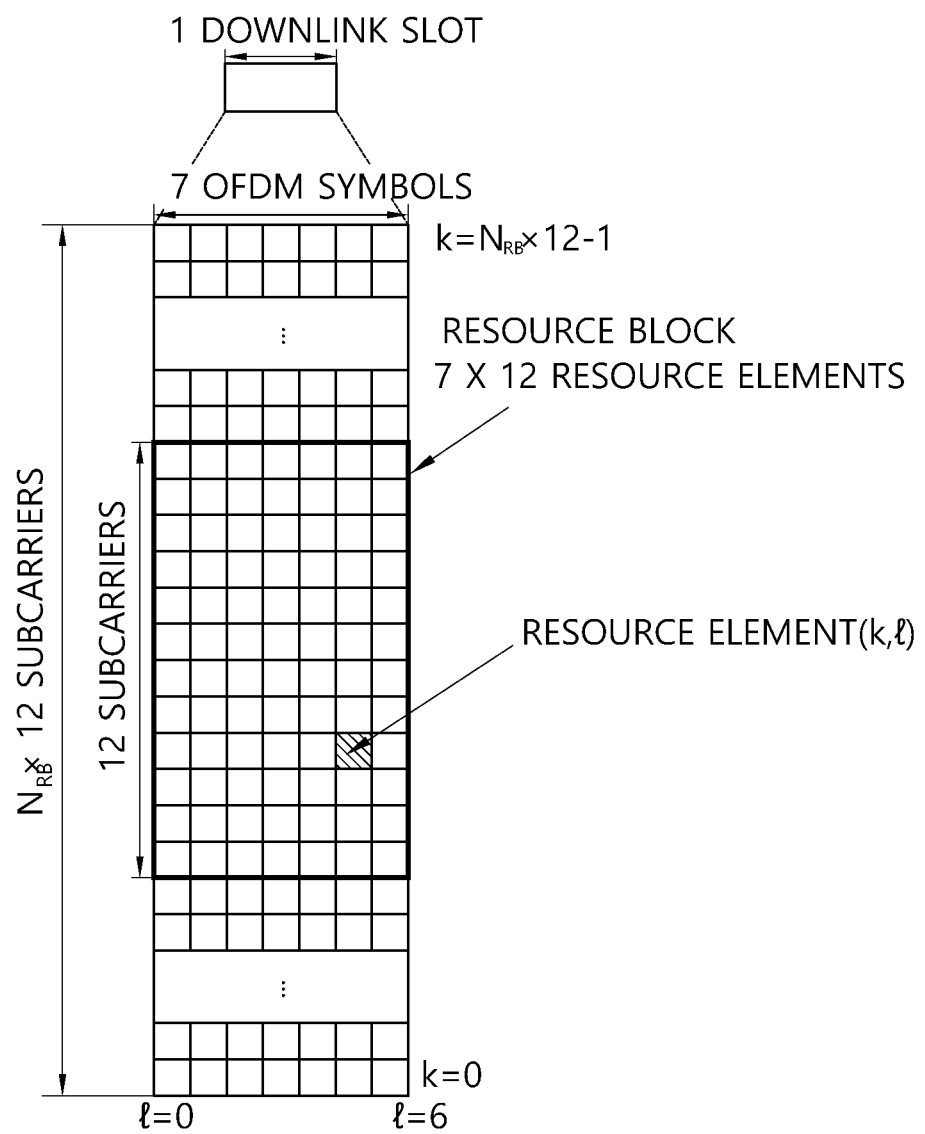
FIG. 4 is an exemplary diagram illustrating a resource grid for one uplink or downlink slot in the 3GPP LTE.

In 3GPP LTE, the resource grid for one uplink slot shown in FIG. 4 may also apply to the resource grid for the downlink slot.

Figure 5:
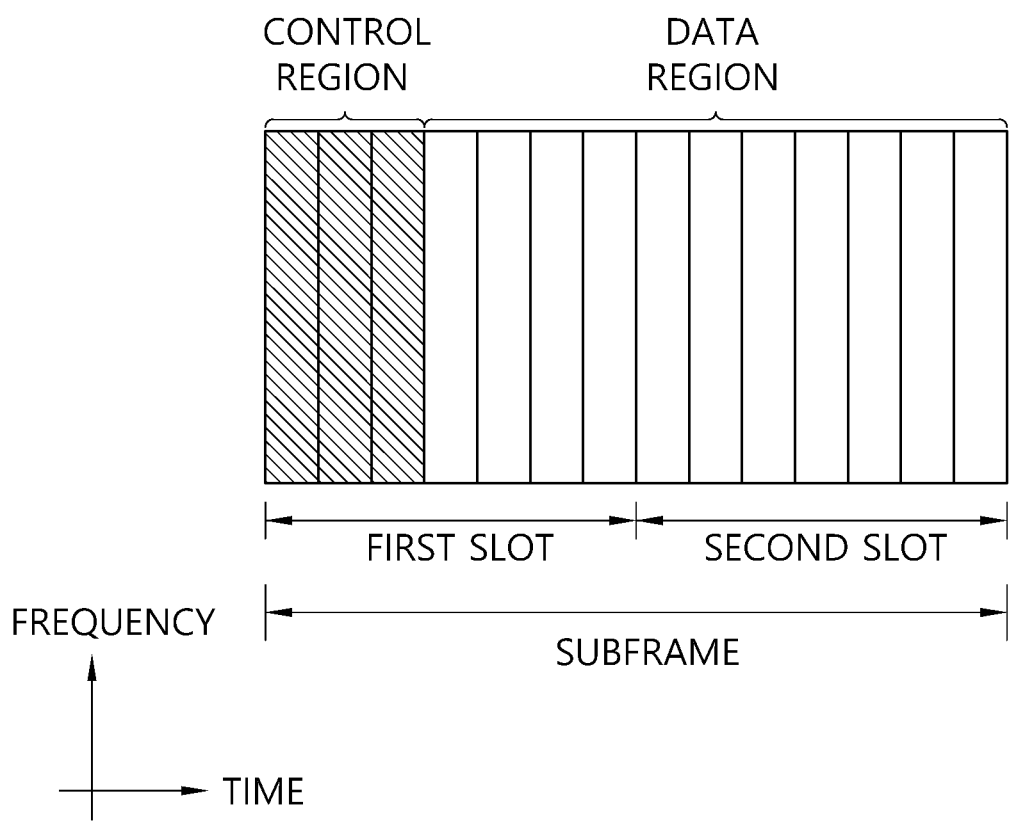
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
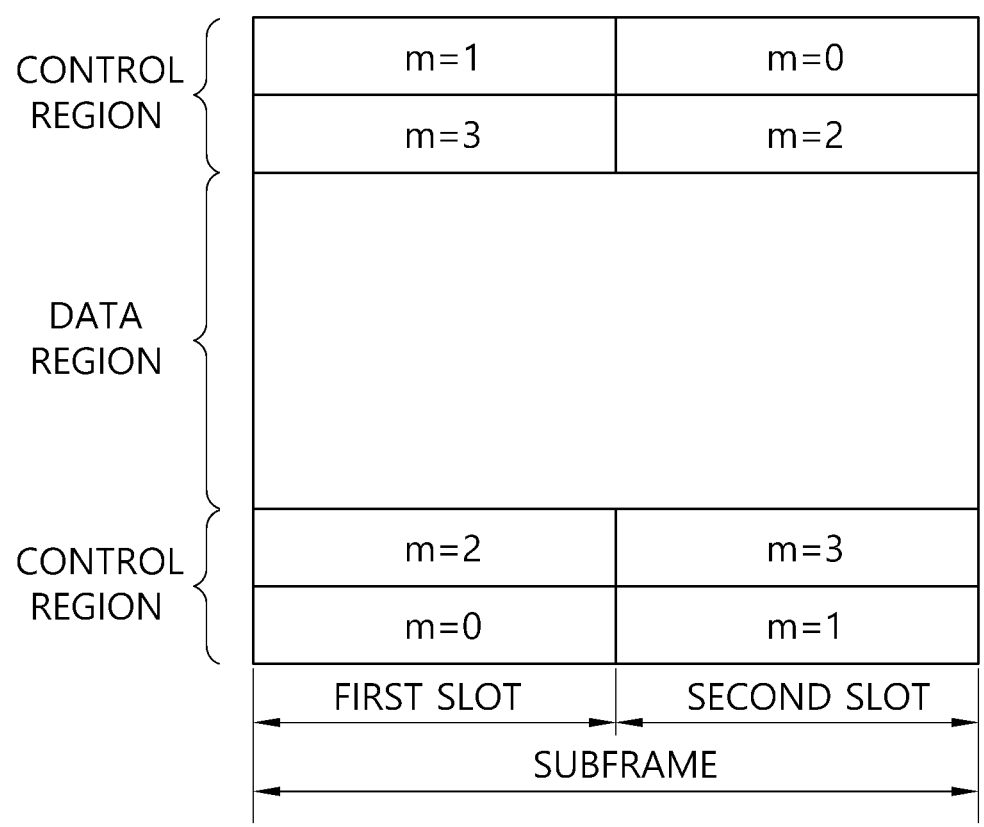
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

FIG. 4 illustrates an example resource grid for one uplink or downlink slot in 3 GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain.

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

TABLE 3

| Operating Band | Uplink (UL) operating band $F_{UL\_low}$-$F_{UL\_high}$ | Downlink (DL) operating band $F_{DL\_low}$-$F_{DL\_high}$ | Duplex Mode |
| --- | --- | --- | --- |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

TABLE 3-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD8, 9 |
| 47 | 5855 MHz-5925 MHz | 5855 MHz-5925 MHz | TDD |
| 48 | 3550 MHz-3700 MHz | 3550 MHz-3700 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD4 |
| 67 | N/A | 738 MHz-758 MHz | FDD2 |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD10 |

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

Figure 7:
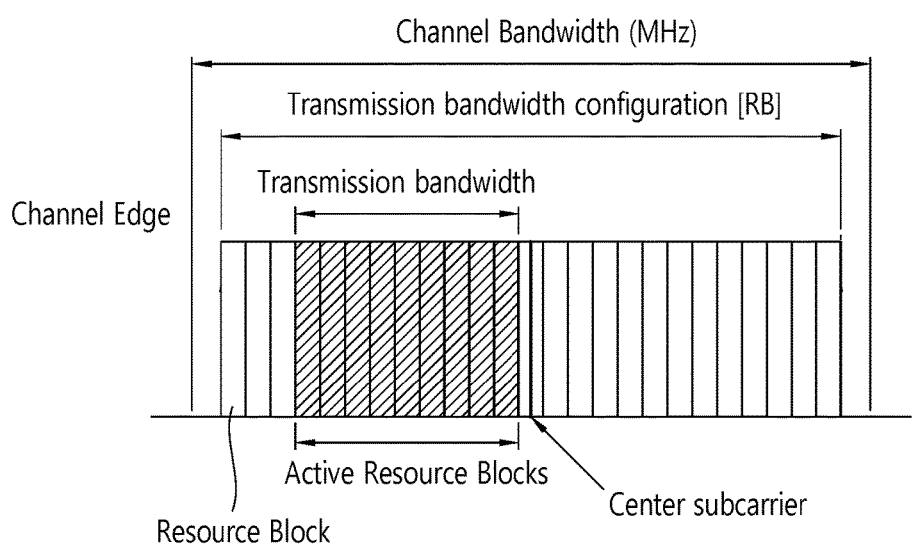
FIG. 7 shows a relation between a channel band MHz and a resource block (RB).

FIG. 7 shows a relation between a channel band MHz and a resource block (RB).

As may be seen with reference to FIG. 7, a transmission bandwidth smaller than a channel bandwidth BWChannel is set. The setting of the transmission bandwidth is performed by a plurality of resource blocks (RBs). Furthermore, the outskirt of a channel is the highest and lowest frequencies separated by the channel bandwidth.

Meanwhile, as described above, a 3GPP LTE system supports channel bandwidths of 1.4 MHz, 3 MHz, 5 MHz, 10 MHz, 15 MHz and 20 MHz. A relation between such a channel bandwidth and a resource block is listed in the following table.

TABLE 4

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Meanwhile, intra-band contiguous CA bandwidth classes and their corresponding guard bands are as shown in the following table.

TABLE 5

| CA Bandwidth Class | Aggregated Transmission Bandwidth Configuration | Maximum number of CCs | Nominal Guard Band $BW_{GB}$ |
|---|---|---|---|
| A | $N_{RB,agg} \leq 100$ | 1 | a1 $BW_{Channel(1)}$ − 0.5Δf1 (NOTE2) |
| B | $N_{RB,agg} \leq 100$ | 2 | 0.05 max($BW_{Channel(1)}$, $BW_{Channel(2)}$) − 0.5Δf1 |
| C | $100 < N_{RB,agg} \leq 200$ | 2 | 0.05 max($BW_{Channel(1)}$, $BW_{Channel(2)}$) − 0.5Δf1 |
| D | $200 < N_{RB,agg} \leq [300]$ | FFS | 0.05 max($BW_{Channel(1)}$, $BW_{Channel(2)}$) − 0.5Δf1 |
| E | $[300] < N_{RB,agg} \leq [400]$ | FFS | FFS |
| F | $[400] < N_{RB,agg} \leq [500]$ | FFS | FFS |

NOTE1:

$BW_{Channel(j),j}$ = 1, 2, 3 is the channel bandwidth of the E-UTRA component carriers defined in TS36.101 table 5.6-1, Δf1 represents subcarrier spacing of Δf when downlink, and Δf1 = 0 in downlink.

(NOTE2):

In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RBs aggregated in an aggregation channel band.

<License Assisted Access (LAA)>

Recently, as more communication devices require a larger communication capacity, the efficient utilization of the limited frequency band in the next generation wireless communication system is gradually becoming a more and more important requirement. The cellular communication system such as LTE system is considering to utilize unlicensed band such as 2.4 GHz which is used by the existing WLAN system or unlicensed band such as 5 GHz band, in the traffic detouring. Such an unlicensed band may be carrier-aggregated (CA) with the licensed band so as to be used. Likewise, using the unlicensed band under the support of the licensed band by the carrier aggregation is called license assisted access (LAA).

Figure 8:
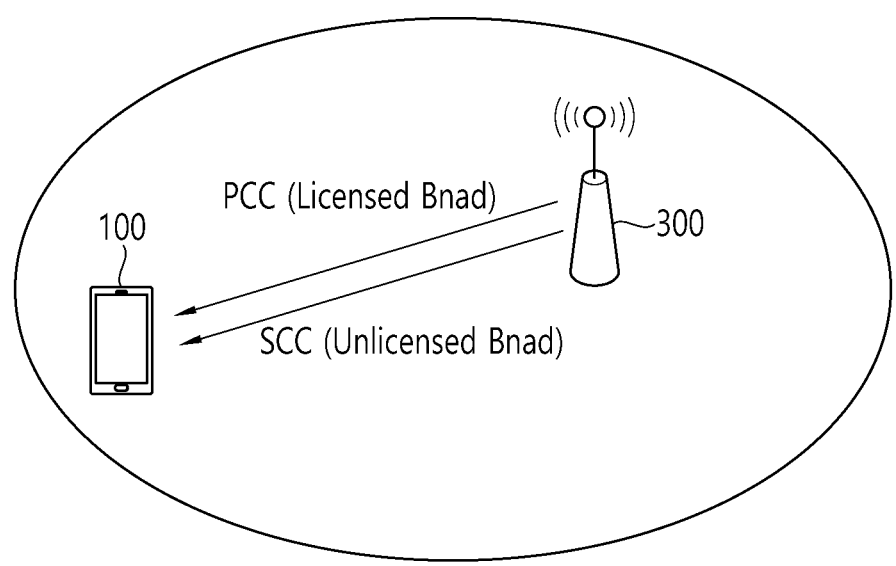
FIG. 8 illustrates an example of using licensed band and unlicensed band as carrier aggregation.

FIG. 8 illustrates an example of using licensed band and unlicensed band as carrier aggregation.

In order to transmit and receive signals through the carrier of the unlicensed band which does not guarantee the exclusive use of a certain system, as shown in FIG. 8, a small cell transmits signals to UE 100 or the UE transmits signals to the small cell 30 by using the carrier aggregation of the LTE-A band, which is the licensed band, and the unlicensed band. Here, for example, the carrier in the licensed band may be understood as a primary CC (may also be referred to as "PCC" or "PCell"), and the carrier of the unlicensed band may be understood as the secondary CC (may also be referred to as "SCC" or "SCell"). However, even in the situation where a plurality of licensed bands and a plurality of unlicensed bands are used as the carrier aggregation scheme, the above suggested schemes may be applied, and even in the situation where signals are transmitted and received between the eNB and the UE with only the unlicensed band, the schemes may be applied. Further, the suggested schemes may also be applied in systems with different features as well as 3GPP LTE system.

Further, as an example of an unlicensed band operation which is operated with a contention-based arbitrary connection scheme, an eNB 200 may perform carrier sensing (CS) before transmitting and receiving data. Likewise, performing carrier sensing (CS) before data transmission may be defined as listen before talk (LBT). At this time, the case where another communication node does not transmit signals may be defined as having been confirmed by clear channel assessment (CCA).

Figure 9:
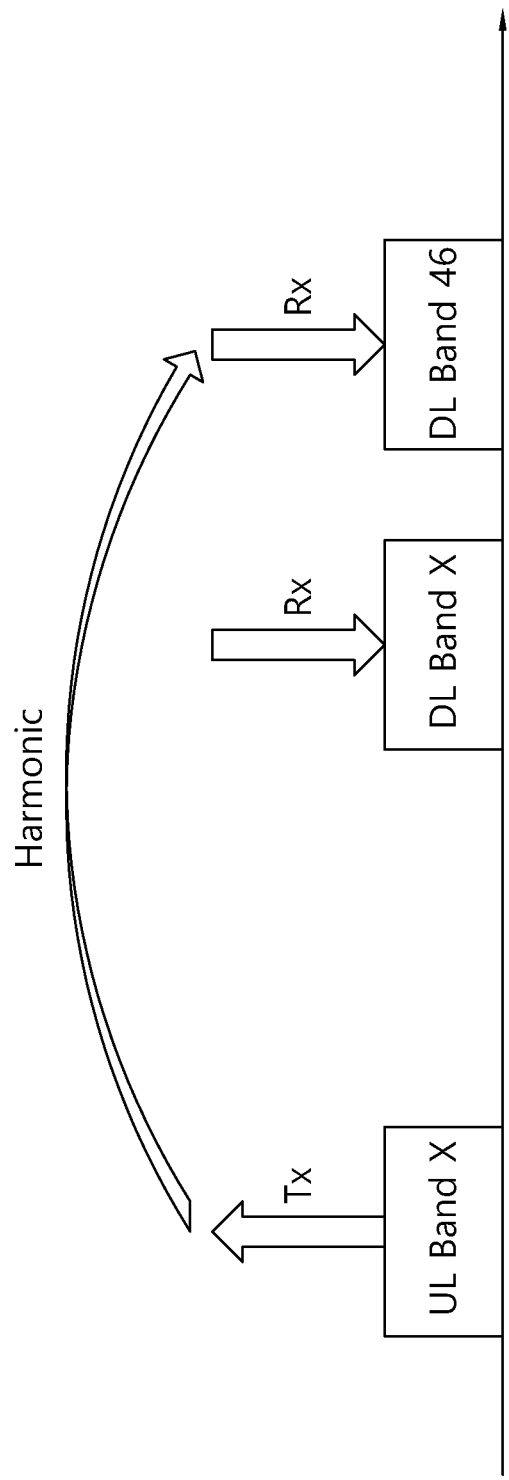
FIG. 9 illustrates an example of sensitivity degradation by harmonics component.

FIG. 9 illustrates an example of sensitivity degradation by harmonics component.

As shown in FIG. 9, in 2 downlinks (DLs)/1 uplink (UL) CA band combination, a harmonic component caused by an uplink transmission may leak into a DL band 46.

Accordingly, the present specification discloses a first study about how much sensitivity relaxation is required in band 46 due to x-order harmonics in 2 downlinks (DLs)/1 uplink (UL) CA band combination. Also, the present specification discloses a second study about how far it is separated from a band effected by the harmonics in order to meet an existing reference sensitivity (REFSENS) requirement in case where the sensitivity relaxation is not allowed. The first study is aimed at providing a frequency gap for preventing a degradation of the reception performance.

Hereinafter, results for measuring attenuation level in 5.9 GHz band and characteristic of radio frequency (RF) elements will be described.

Below Table 6 lists results for measuring harmonic in output terminal of the power amplifier (PA).

TABLE 6

| Release | Band | | Order | | Harmonic (Max) [dBm] |
|---|---|---|---|---|---|
| 13 | B1 | 1920-1980 | 3x | 5760-5940 | −14.15 |
| 13 | B2 | 1850-1910 | 3x | 5550-5730 | −14 |
| 13 | B3 | 1710-1785 | 3x | 5130-5355 | −16.31 |
| 13 | B4 | 1710-1755 | 3x | 5130-5265 | −17 |
| 14 | B5 | 824-849 | 7x | 5768-5943 | −38.31 |
| 13 | B7 | 2500-2570 | 2x (just-miss) | No overlapped in B46 | −29.08 |
| 14 | B8 | 880-915 | 6x | 5280-5490 | −36.36 |
| 14 | B11 | 1428-1448 | 4x | 5712-5792 | TBD |
| 14 | B13 | 777-787 | 7x | 5439-5509 | −37.54 |
| 14 | B19 | 830-845 | 7x | 5810-5915 | −42.07 |
| 14 | B21 | 1448-1463 | 4x | 5792-5852 | TBD |
| 14 | B28 | 703-748 | 8x | 5624-5984 | −36.67 |
| 14 | B39 | 1880-1920 | 3x | 5640-5760 | −13.52 |
| 14 | B40 | 2300-2400 | 2x | No overlapped in B46 | |
| 13 | B41 | 2496-2690 | 2x | 4992-5380 | −11.37 |
| 13 | B42 | 3400-3600 | Freq proximity | No overlapped in B46 | |
| 14 | B66 | 1710-1780 | 3x | 5130-5340 | −16.31 |

Here, the TBD means 'to be discussed'.

Below Table 7 lists attenuation levels in 5.9 GHz according to frequency bands and vendors of duplexer.

TABLE 7

| Band | Vendor | tech | P/N | Tx IL typ. | Rx IL typ. | Tx Atten (5150~5925 MHz) [dB] typ. | min. |
|---|---|---|---|---|---|---|---|
| B1 | Murata | DPX | SAYEY1G95GA0F0A | 1.5 | 1.8 | 21 | 16 |
| B2 | EPCOS | DPX | D5295 (FEMiD) | 1.6 | 2.1 | 17 | 11 |
| B3 | Murata | DPX | SAYFH1G74CA0B0A | 2.0 | 2.6 | 20 | 10 |
| B4 | Murata | DPX | SAYEY1G73BC0F0AR00 | 2.1 | 1.8 | 16 | 10 |
| B5 | Murata | DPX | LMSWARGP-H77 (FEMiD) | 2.0 | 2.6 | | 15 |
| B7 | Murata | DPX | SAYEY2G53BC0F0AR00 | 2.2 | 2.0 | 39 | 20 |
| B8 | EPCOS | DPX | B8605 | 2.0 | 1.7 | 21 | 10 |
| B11 | Murata | DPX | SAYRF1G43BA0F0A | 1.3 | 1.6 | 21 | 12 |
| B13 | Qorvo | DPX | TQQ1013 | 2.2 | 2.1 | 30 | 20 |
| B19 | Murata | DPX | LMSWARGP-H77 (FEMiD) | 2.0 | 2.6 | | 15 |
| B21 | Murata | DPX | SAYEY1G45BA0F0A | 1.5 | 1.4 | 13 | 7 |

TABLE 7-continued

| Band | Vendor | tech | P/N | Tx IL typ. | Rx IL typ. | Tx Atten (5150~5925 MHz) [dB] typ. | min. |
|---|---|---|---|---|---|---|---|
| B28 | WISOL | DPX | B8538(B28A) B8539(B28B) | 1.9 | 2.3 | 22 | 15 |
| B39 | Murata | TDD_Filter | LMSWARGP-H77 (FEMiD) | 1.6 | 1.6 | | 15 |
| B41 | Murata | TDD_Filter | SAFRD2G59MA0F0A | 3.3 | 3.3 | 22 | 17 |
| B66 | EPCOS | DPX | MQ02B | 2.7 | 2.6 | 31 | 20 |

Below table 8 show the UE UL harmonics impacts to Band 46 for LAA CA band combinations in rel-13 and rel-14.

TABLE 8

| Licensed Band | | | Conclusion | |
|---|---|---|---|---|
| UL Range (MHz) | Order | B46 Range (MHz) 5150-5925 Harmonic Range (MHz) | MSD with/without HTF | GAP |
| B1 | 1920-1980 | 3x | 5760-5940 | Completed | [15] |
| B2 | 1850-1910 | 3x | 5550-5730 | Completed | [15] |
| B3 | 1710-1785 | 3x | 5130-5355 | Completed | [15] |
| B4 | 1710-1755 | 3x | 5130-5265 | Completed | [15] |
| B5 | 824-849 | 7x | 5768-5943 | TBD | TBD |
| B7 | 2500-2570 | 2x | No overlapped in B46 | TBD | TBD |
| B8 | 880-915 | 6x | 5280-5490 | TBD | TBD |
| B11 | 1428-1448 | 4x | 5712-5792 | TBD | TBD |
| B13 | 777-787 | 7x | 5439-5509 | TBD | TBD |
| B19 | 830-845 | 7x | 5810-5915 | TBD | TBD |
| B21 | 1448-1463 | 4x | 5792-5852 | TBD | TBD |
| B28 | 703-748 | 8x | 5624-5984 | TBD | TBD |
| B39 | 1880-1920 | 3x | 5640-5760 | Completed | [15] |
| B40 | 2300-2400 | 2x | No overlapped in B46 | TBD | N/A |
| B41 | 2496-2690 | 2x | 4992-5380 | TBD | TBD |
| B42 | 3400-3600 | 2x | No overlapped in B46 | TBD | N/A |
| B66 | 1710-1780 | 3x | 5130-5340 | Completed | [15] |

Figure 10:
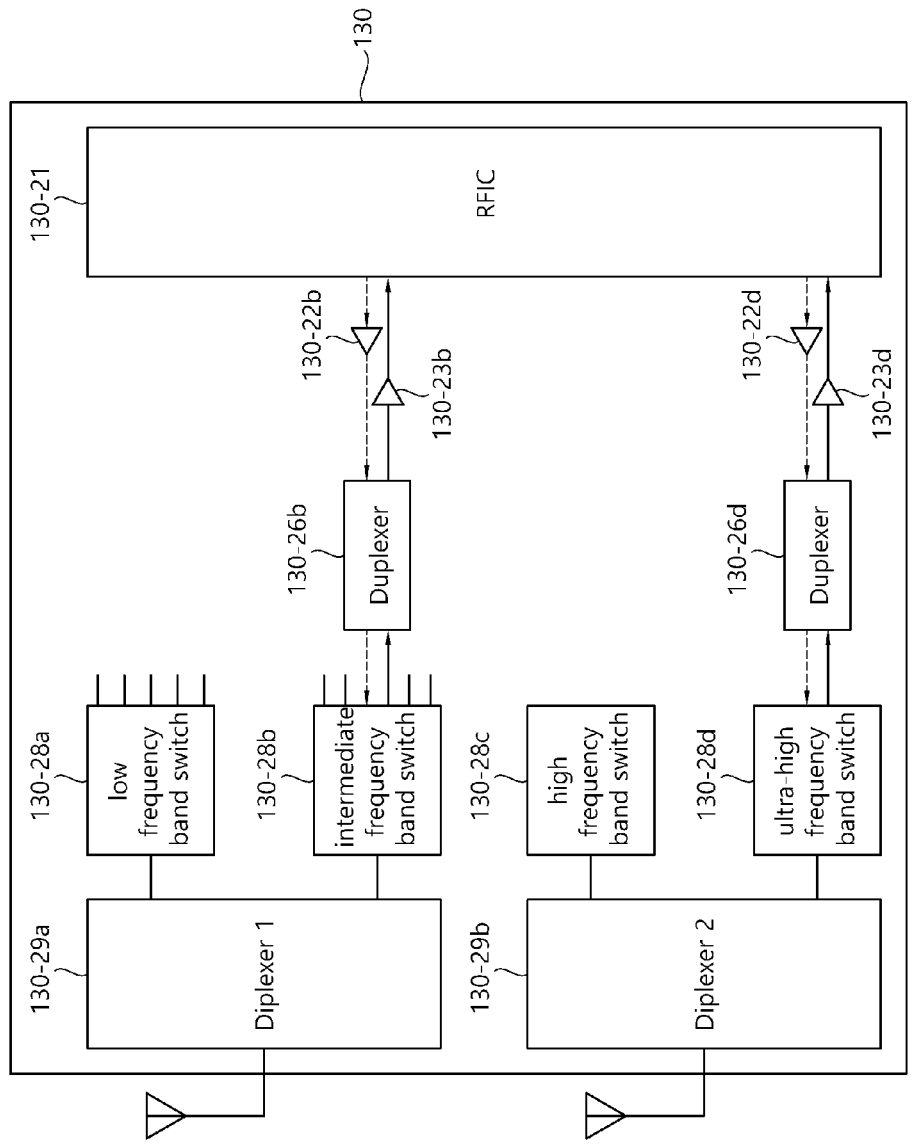
FIG. 10 illustrates an RF structure for E-UTRA cellular communication and V2X communication.

FIG. 10 illustrates an RF structure for E-UTRA cellular communication and V2X communication.

As shown in FIG. 9, in 2 downlinks (DLs)/1 uplink (UL) CA band combination, a harmonic component caused by an uplink transmission may leak into a DL band 46.

Accordingly, the present specification discloses a first study about how much sensitivity relaxation is required As shown in FIG. 10, there are an RFIC 130-21 that includes multiple RF chains, a first diplexer 130-29a coupled to a first antenna, a second diplexer 130-29b coupled to a second antenna, a switch 130-28a connected to a first diplexer 130-29a for discriminating a plurality of low frequency bands, a switch 130-28b connected to the first diplexer 130-29a for discriminating a plurality of intermediate frequency bands, a switch 130-28c connected to a second diplexer 130-29b for discriminating a plurality of high frequency bands, and a switch 130-28d connected to the second diplexer 130-29b for discriminating a plurality of ultra-high frequency bands.

The duplexer 130-26b is connected to the intermediate frequency band switch 130-28b. The PA 130-22b and the LNA 130-23b are connected between the duplexer 130-26b and the RFIC 130-21.

Similarly, the duplexer 130-26d is connected to the ultra-high frequency band switch 130-26d. The PA 130-22d and an LNA 130-23d are connected between the duplexer 130-26d and the RFIC 130-21.

The duplexer 130-26b connected to the intermediate frequency band switch 130-28b may separate transmission and reception of the operation band 3 for V2X communication, for example.

<Disclosure of the Present Specification>

<The Test Methodology and Specification Aspect for High Power LTE-Based V2X UE>

In the present invention, 'high power' of the V2X (vehicle to everything communication) terminal (or the vehicle, etc) means transmission power of the V2X terminal (or the vehicle, etc) is higher than transmission power of D2D terminal. That is, 'high power' in the present invention indicates transmission power of the V2X terminal.

When the V2X communication between a vehicle and a vehicle or a vehicle and everything using a sidelink, that is, a direct communication between the vehicles through the network or without the network in an out-of-coverage, the vehicle has no restriction on a battery unlike the wireless terminal, so a need for a higher power transmission compared to the wireless terminal has arisen.

However, because there are constraints according to RF devices and regulation in the actual ITS spectrum, it is necessary to analyze the phenomenon and discuss how regional regulation will be reflected in 3GPP. Accordingly, the present invention analyzes RF characteristics (antenna, power amplifier, switch, filter, etc.) used in the vehicle or the wireless terminal and proposes a standards for a vehicle supporting high power based on the analysis. This proposal basically aims at a standard format for data measured at an antenna connector, and this proposal can be limited to a vehicle or a wireless terminal used in the ITS bands (5855~5925 MHz).

In Europe and US, the maximum output power up to 33 dBm of EIRP (Effective or Equivalent Isotropic Radiated Power) is allowed for commercial ITS service in 5850-5925 MHz as shown in Table 9. The EIRP is the amount of radiated power of isotropic antenna and typically peak power density measured in direction of maximum antenna gain. However, EIRP includes conducted RF power and antenna gain which is not in line with LTE UE Tx RF requirements, since 3GPP has defined only the maximum conducted power at antenna connector. So the antenna gain term is not test scope for UE conformance test, hence RAN4 has assumed the antenna gain as 0 dBi in UE RF characteristics so far. This is only covered in OTA test requirements in 3GPP LTE specification.

TABLE 9

Maximum transmit power classification of DSRC UE

| Region/Frequency range | Max. output power (e.i.r.p) | | Power spectral density (e.i.r.p) |
|---|---|---|---|
| EU: 5855–5925 MHz | RF output power shall not exceed 33 dBm | | PSD shall not exceed 23 dBm/MHz |
| US: 5850–5925 MHz | Power class A | 0 dBm → 23 dBm (e.i.r.p): Need 23 dB Antenna Gain | PSD 0 dBr/100 kHz in transmitted channel |
| | Power class B | 10 dBm → 23 dBm (e.i.r.p): Need 13 dB Antenna Gain | Spectrum emission mask requirements according |
| | Power class C | 20 dBm → 33 dBm (e.i.r.p): Need 13 dB Antenna Gain | to the Power class as shown in Table 2 |
| | Power class D | 28.8 dBm → 33 dBm (e.i.r.p): Non-government Need 4.2 dB Antenna Gain 28.8 dBm → 44.8 dBm (e.i.r.p): Only Government | |

And Table 10 shows the unwanted emission requirements in ITS spectrum in Europe and US. The measurement of transmit channel bandwidth is 100 kHz resolution

TABLE 10

Spectrum mask for 10 MHz channel Bandwidth in ITS spectrum

| Region/ Frequency range | RF output power (e.i.r.p) | Permitted power spectral density(dBr) according to Frequency offset | | | | |
|---|---|---|---|---|---|---|
| | | ±4.5 MHz offset | ±5.0 MHz offset | ±5.5 MHz offset | ±10.0 MHz offset | ±15.0 MHz offset |
| EU: 5855–5925 MHz | 33 dBm | 0 | −26 | −32 | −40 | −50 |
| US: 5850–5925 MHz | Power class A | 0 | −10 | −20 | −28 | −40 |
| | Power class B | 0 | −16 | −20 | −28 | −40 |
| | Power class C | 0 | −26 | −32 | −40 | −50 |
| | Power class D | 0 | −35 | −45 | −55 | −65 |

From above analysis, V2X UE shall not exceed 33 dBm of output power within total transmitted channel bandwidth and shall not exceed some PSD (Power Spectral Density) regulation such as SEM requirements according to the power class and 23 dBm/MHz PSD requirement in transmitted channel during transmitted bursts.

If we can take a look similar service in ITS spectrum such as DSRC (dedicated short-range communications), most commonly DSRC UE in power class C uses conducted maximum output power of 20 dBm in US, which is much less than that of LTE UE in Band 46. One consideration point is that how much radiated power from commercial DSRC UE supporting 33 dBm of power class C depends on the characteristics of DSRC RF components such as gain of antenna and available output power of power amplifier in 5.9 GHz.

I. Power Amplifier for V2X Service in ITS Spectrum

RF characteristics of commercial PA in DSRC UE application are summarized in Table 11.

These PA model are applicable for both of commercial DSRC UE and WLAN UE in 5 GHz. When we consider 3 dB front-end (FE) loss in vehicle, then the maximum output power in antenna connector will be 26−3=23 dBm that can meet the regulation in ITS spectrum with some margin in US for power class C UE.

Hence, the output power of common PAs for DSRC UE with power class C is less or equal to 23 dBm when 3 dB FE loss are considered for V2X vehicle in ITS spectrum.

For DSRC UE in Europe or power class D UE in US, the available conducted power is 23 dBm as the max power, when consider the current PA characteristics, 3 dB FE loss and regional regulations.

Hence the maximum output power of DSRC UE is observed as below

Observation1: When consider the regional regulation and commercial PAs, the maximum conducted output power of DSRC UE at antenna connector is less than 23 dBm.

TABLE 11

Spectrum mask for 10 MHz channel Bandwidth in ITS spectrum

| Maker | Saturated Pout [dBm] | Supported freq. | EVM, Gain | Typical Vcc, CH BW |
|---|---|---|---|---|
| Vendor A | 23 | 4.9 to 5.9 GHz | 2.5%, 30 dB | 3.3 V, 20 MHz |
| Vendor B | 25 | 4.9 to 5.925 GHz | 3%, 33 dB | 5 V, 20 MHz |
| Vendor B | 26 | 4.9 to 5.925 GHz | 3.15%, 32 dB | 5 V, 20 MHz |
| Vendor C | 26 | 5 GHz | 3%, 32 dB | 5 V, 20 MHz |

II. Antenna Characteristics for V2X Service in ITS Spectrum

The technical trend of vehicle antenna is to support multi-band and multi-mode for cellular, GPS, Wi-Fi and DSRC within one antenna. Generally, tri or quad band has been deployed in DSRC market.

TABLE 12

Antenna performance of DSRC UE for V2X service in ITS spectrum

| Maker | Type | Supported mode | Antenna Gain in 5.9 GHz [dB] | Comment |
| --- | --- | --- | --- | --- |
| Vendor A | Shark | GPS, GSM/LTE, WiFi, ITS | 5 dBi | |
| Vendor A | Stick | ITS | 6 dBi~12 dBi | Ant. Length: Up to 45.7 cm |
| Vendor B | Patch | ITS | 6 dBi | |
| Vendor C | Stick | ITS | 5 dBi | Ant. Length: 30 cm |
| Vendor D | Shark | GPS, WiFi, ITS | 5 dBi | |

From the summarized Table 12, nominal antenna gain is about 5~6 dB and some of long type stick antenna can provide higher gain compare to multi-band shark antenna.

Hence, we can expect the maximum output power (e.i.r.p) of DSRC vehicle might be about 28~29 dBm in ITS spectrum from commercial PA component and antenna characteristics.

Observation2: The maximum output power (e.i.r.p) of DSRC vehicle is about 28~29 dBm using commercial PA and antenna.

Therefore, it is not common understanding to consider maximum 33 dBm output power for DSRC vehicle in real field.

Proposal 1: RAN4 should consider the current states of art technology of RF components for specifying maximum output power of LTE-based V2X UE.

III. Specification Aspect to Support 33 dBm Maximum Power of LTE-Based V2X UE

From the current RF component characteristics, we can see the maximum output power of DSRC vehicle in ITS spectrum is 23 dBm in conducted mode that is similar to legacy LTE UE.

Also, specifying and measuring maximum power based on EIRP is quite difficult especially for vehicle and there is no consistence with legacy LTE system.

So basic principle to define 33 dBm vehicle UE in ITS spectrum is that follow the legacy maximum power definition as a conducted test mode with the assumption of antenna gain as up to 6 dBi not 0 dBi.

For the adjacent coexistence evaluation, RAN4 should verify the high power impacts in ITS spectrum. Then the determined ACLR and ACS levels for LTE-based V2X UE in ITS spectrum will be applied for V2X UE power class with positive antenna gain.

From these analysis, we propose as below,

Proposal 2: RAN4 should keep the conducted test methodology for LTE-based V2X UE RF requirements considering the positive antenna gain.

For the specification aspect of LTE-based V2X UE, we show 4 candidates options to support up to 33 dBm maximum output power based on conducted test mode.

Candidate solution to support high power LTE-based V2X UE

Option1: Power class 3 (23 dBm)+antenna gain (up to 6 dBi)
  1) Pros: Easy to specify, follow legacy Tx RF requirements, except ACLR and ACS
  2) Cons: No benefits compare to DSRC UE as competition aspect Option2: Power class 2 (26 dBm)+antenna gain (up to 6 dBi)
  1) Pros: Easy to specify, follow legacy Tx RF requirements, except ACLR and ACS, support higher output power compare to DSRC UE
  2) Cons: Need technical support to satisfy the 26 dBm output power in ITS spectrum Option3: Power class 1 (31 dBm)+antenna gain (up to 2 dBi)
  1) Pros: Easy to specify, follow legacy Tx RF requirements, except ACLR and ACS, support higher output power compare to DSRC UE
  2) Cons: Need high gain PA module in ITS spectrum (difficult considering current state of art technology)

Option4: new power class X (28 dBm)+antenna gain (up to 5 dBi)
  1) Same with Option3

In the candidate options, option1 and option2 are preferred since these solutions are easy to specify and almost same with DSRC UE as technical aspect. Option2 is more competitive with DSRC UE in ITS spectrum since it can support higher maximum output power. Option 3 and option 4 are quite aggressive to achieve high gain PA module in ITS spectrum.

Based on above analysis, we propose as below,

Proposal 3: RAN4 can Support High Power LTE-Based V2X UE with Legacy Power Class 2 or 3 Considering with Up to 6 dB Antenna Gain.

<LTE-Based V2X UE Transmitter Requirements>

I. Introduction

In the RAN4 #80BIS meetings, RAN4 agreed how to specify the power class for high power V2X UE at 5.9 GHz as below.

Decided solution: Power class 2+antenna gain (up to 6 dBi)
  PROS: Easy specify to support high max. power, follow legacy Transmission RF requirements except ACLR and ACS
  CONS: Need technical support to satisfy the 26 dBm maximum output power at antenna connector in ITS spectrum In the present invention, we provide our views on how to define general TX requirements based on the previous RAN4 agreements to support up to 33 dBm high power for LTE-based V2X UE.

II. Basic RF Architecture for LTE-Based V2X UE

For LTE-based V2X service in Rel-14, RAN4 can consider example RF architecture as shown in FIG. 10.

In the RAN4 meeting, RAN4 agreed the priority of multi-carrier operation as below.

1$^{st}$ Priority for MCC Operation:
  Multi carrier operation with Band 47 (PC5 V2X) and licensed bands (Uu V2X)
  Multi carrier operation at Band 47 (PC5 V2X)
  Multi carrier operation with Band 47 (PC5 V2X) and licensed bands (WAN)

Hence, RAN4 can focus on the inter-band con-current operation between Band 47 and licensed Band (e.g. B3/B8/B39 and B41) for V2X service.

Also, RAN4 should define multi-carrier operation at Band 47 for V2X service. The other licensed bands for legacy LTE service can be operated with Band 47 simultaneously.

Table 13 shows the UL harmonic problem by legacy LTE UL transmission.

TABLE 13

UL harmonics impacts on Band 47

| Licensed Band | | | B47 Range (MHz) 5855-5925 | | |
|---|---|---|---|---|---|
| E-UTRA band | UL Range (MHz) | Order | Harmonic Range (MHz) | Comments | Service |
| B3 | 1710-1785 | 3x | 5130-5355 | No Harmonics/IMDs | V2X |
| B8 | 880-915 | 6x | 5280-5490 | No Harmonics/IMDs | |
| B39 | 1880-1920 | 3x | 5640-5760 | No Harmonics/IMDs | |
| B41 | 2496-2690 | 2x | 4992-5380 | No Harmonics/IMDs | |
| B1 | 1920-1980 | 3x | 5760-5940 | Harmonic impact | Legacy WAN |
| B5 | 824-849 | 7x | 5768-5943 | Harmonic impact | |
| B19 | 830-845 | 7x | 5810-5915 | Harmonic impact | |
| B20 | 832-862 | 7x | 5824-6034 | Harmonic impact | |
| B21 | 1448-1463 | 4x | 5792-5852 | Side-lobe impact | |
| B26 | 814-849 | 7x | 5698-5943 | Harmonic impact | |
| B28 | 703-748 | 8x | 5624-5984 | Harmonic impact | |
| B31 | 452.5-457.5 | 13x | 5882.5-5947.5 | Harmonic impact | |
| B65 | 1920-2010 | 3x | 5760-6030 | Harmonic impact | |
| The other Licensed bands | — | Xx | — | No Harmonic impact. But need to IMD analysis into Band 47 and own licensed operating bands | Legacy WAN |

Therefore, the license band without harmonics/IMD problems can be con-current operated for V2X service with Band 47 in $1^{st}$ phase. The other licensed bands (w/o harmonics/IMDs problems) for legacy LTE operation can be con-current operated by operator request.

In $2^{nd}$ phase, RAN4 will analyze the A-MPR requirements to solve the harmonics/IMDs problems into Band 47.

III. Transmitter Requirements for V2X Service

Table 14 summarizes V2V UE Tx RF requirements in TS36.101.

TABLE 14

| Section/ Clause [1] | Description |
|---|---|
| 6.2.2 | UE maximum output power |
| 6.2.3G | UE maximum output power for modulation/channel bandwidth for V2V UE |
| 6.2.4G | UE maximum output power with additional requirements for V2V UE |
| 6.2.5G | Configured transmitted Power for V2V UE |
| 6.3.2 | UE Minimum output power |
| 6.3.3 | UE Transmit OFF power |
| 6.3.4G | ON/OFF time mask for V2V UE |
| 6.3.5G | Power control for V2V UE |
| 6.5.1G | Frequency error for V2V UE |
| 6.5.2G | Transmit modulation quality for V2V UE |
| 6.6.2.2.4 | Additional SEM for V2V UE |
| 6.6.2.3 | Adjacent Channel Leakage Ratio |
| 6.6.2G | Out of band emission for V2V UE |
| 6.6.3.1 | General SE (up to 26 GHz) |
| 6.6.3G | Spurious Emission for V2V UE |

For V2V UE in rel-14, RAN4 had consensus that the maximum power is only consider 23 dBm with 0 dBi antenna gain to define general transmitter RF requirements. Therefore LTE-based V2V UE with power class 3 satisfy the ETSI regulation easily. However, RAN4 need further study how to satisfy the PSD requirements for up to 33 dBm UE in this V2X WI.

Some companies proposed to support the separate maximum output power between Uu operation in legacy operating band and PC5 operation in Band 47.

Currently, 3GPP RAN4 only specify the total maximum output power for con-current transmission in all existing operating bands. So CA UE or con-current operating ProSe UE should divide the total power based on the priority or some criterion.

So it is preferred to define the maximum output power based on power class as a basic principle. And the total power can be separated by the UE configured transmitted power for V2X UE. This approach will be specify in the TS36.101. In the V2X WI, RAN4 consider up to 33 dBm maximum output power for V2X UE. Therefore the legacy LTE system can be support the power class 3 in existing LTE operating bands when RAN4 define the new power class as power class 2+positive antenna gain for V2X UE in Band 47. The power class 2 shall be separated as two categories as class2 (0 dB ant. gain) and class 2A (positive ant. gain up to 6 dB).

TABLE 15

Con-current maximum output power for V2X UE

| | B3/B8/B39/B41 in power class 3 | B47 (in power class 2/3 + positive ant. gain) | Total power | Comment |
|---|---|---|---|---|
| Con-current power | 23 | 23 + 0 (power class3) | 26 | Operator request |
| | 23 | 26 + 0 (power class 2) | 27.8 | Support |
| | 23 | 26 + 6 (power class 2A) | 32.5 | Support due to tolerance |

One remarkable changing point from RAN1/2 is that V2V transmission signal can be prioritized over LTE transmission data in some special cases. Then the configured transmitting power can be changed from previous V2V UE specification.

Also, RAN4 should support V2P and V2I operation in V2X WI. Hence the SSSS ON/OFF time mask should be modified since DMRS position in PSBCH was changed in RAN1.

It is summarized that the estimated the LTE-based V2X Tx requirements for con-current multi-carrier operation in Table 16.

TABLE 16

Estimated UE Tx RF requirements for V2V UE transmission

| Section/Clause [1] | Reference for Description | Comment |
|---|---|---|
| 5.5G | Operating bands for V2X | Add the con-current band combinations for LTE-based V2X service |
| 5.6G | Channel bandwidth for V2X | Add BCS for con-current operation |
| 6.2.2 and 6.2.2A | UE maximum output power for V2X | Add new power class for Band 47 and add multi-carrier band combinations in new power class |
| 6.2.3G | MPR for modulation/CBW | Need to define MPR for simultaneous SA and Data transmission with FDM for high power V2X UE (up to 33 dBm) and Multi-clustered transmission in Band 47 |
| 6.2.4G | UE max output power with additional requirements | Define new the A-MPR requirements for high power V2X UE to satisfy the ETSI regulatory spectrum emission level |
| 6.2.5G | Configured transmitted Power for V2X | Add configured Tx power for con-current operation between V2X service and legacy LTE service based on the priority. |
| 6.3.2G | UE Minimum output power for V2X | No need to change per carrier |
| 6.3.3G | UE Transmit OFF power for V2X | No need to change per carrier |
| 6.3.4G | ON/OFF time mask for V2X | SSSS Time mask should change since RAN1 DM-RS design was revised |
| 6.3.5G | Power control for V2X | Add same requirements per carrier for con-current operation |
| 6.5.1G | Frequency error for V2X | All sync. Source will be defined with ±0.1 ppm |
| 6.5.2G | Transmit modulation quality for V2X | Expected no need to change since RAN1/2 already define location based resource pool separation to mitigate in-band emission interference. Only add con-current operation. |
| 6.6.2.3G | Adjacent Channel Leakage Ratio | Verify ACLR requirement to satisfy the adjacent channel coexistence with legacy system for high power V2X UE |
| 6.6.2G | Out of band emission for V2X | Add OOB requirements for con-current operation |
| 6.6.3.2A and 6.6.3G | Spurious Emission for V2X | Add new SE UE-to-UE coexistence requirements for con-current operation |

For LTE-based V2X UE TX requirements, we described the estimated changing issues in Table 16 to support high power V2X UE up to 33 dBm and con-current V2X operation.

Therefore, according to above description, the V2X terminal (or the vehicle) may determine that a transmission power of a V2X signal does not exceed 33 dBm. Herein the transmission power may be determined based on antenna gain and a conducted power, and the conducted power may be determined to not exceed a specific maximum power class. The antenna gain may be at most 6 dBi, and the specific maximum power class may specify at most 26 dBm.

The transmission power may be defined at Evolved Universal Terrestrial Radio Access (E-UTRA) band 47, and the specific maximum power class may be power class 2. The antenna gain may be always positive, and the transmission power may be an Equivalent Isotropic Radiated Power (EIRP).

IV. Maximum Output Power for V2X UE

The V2X UE Power Classes define the maximum output power for any transmission bandwidth within the channel bandwidth. The period of measurement shall be at least one subframe (1 ms).

TABLE 17

V2X UE Power Class

| EUTRA band | Class 1 (dBm) | Tolerance (dB) | Class 2 (dBm) | Tolerance (dB) | Class 2A (dBm) | Tolerance (dB) | Class 3 (dBm) | Tolerance (dB) | Class 4 (dBm) | Tolerance (dB) |
|---|---|---|---|---|---|---|---|---|---|---|
| ... |  |  |  |  |  |  |  |  |  |  |
| 47 |  |  |  |  | 26³ | [+2/−3] | 23 | ±2 |  |  |

NOTE 1:
Band 47 is used for V2X Service.
NOTE 2:
$P_{PowerClass}$ is the maximum UE power specified without taking into account the tolerance
NOTE 3:
Positive antenna gain will be considered.

For the con-current V2X operation, the following V2X UE Power Classes define the maximum output power for any transmission bandwidth within the channel bandwidth. The period of measurement shall be at least one sub frame (1 ms).

TABLE 18

Con-current V2X UE Power Class for uplink interband combination (two bands)

| E-UTRA con-current band Configuration | Class 1 (dBm) | Tolerance (dB) | Class 2 (dBm) | Tolerance (dB) | Class 2A (dBm) | Tolerance (dB) | Class 3 (dBm) | Tolerance (dB) | Class 4 (dBm) | Tolerance (dB) |
|---|---|---|---|---|---|---|---|---|---|---|
| CA_3A-47A |  |  |  |  | 26³ | [+2/−3] |  |  |  |  |
| CA_8A-47A |  |  |  |  | 26³ | [+2/−3] |  |  |  |  |
| CA_39A-47A |  |  |  |  | 26³ | [+2/−3] |  |  |  |  |
| CA_41A-47A |  |  |  |  | 26³ | [+2/−3] |  |  |  |  |

NOTE 1:
The con-current operation is used for V2X Service.
NOTE 2:
$P_{PowerClass}$ is the maximum UE power specified without taking into account the tolerance
NOTE 3:
Positive antenna gain will be considered for Band 47.

For intra-band contiguous operating band, the maximum output power is defined in Table 19.

TABLE 19

V2X UE Power Class for intraband contiguous operating band

| E-UTRA CA Configuration | Class 1 (dBm) | Tolerance (dB) | Class 2 (dBm) | Tolerance (dB) | Class 2A (dBm) | Tolerance (dB) | Class 3 (dBm) | Tolerance (dB) | Class 4 (dBm) | Tolerance (dB) |
|---|---|---|---|---|---|---|---|---|---|---|
| CA_47C |  |  |  |  | 26³ | [+2/−3] |  |  |  |  |

NOTE 1:
Band 47 is used for V2X Service.
NOTE 2:
$P_{PowerClass}$ is the maximum UE power specified without taking into account the tolerance
NOTE 3:
Positive antenna gain will be considered.

Therefore, according to above description, the V2X terminal may aggregate two uplink carriers. The two uplink carriers may be operated at Evolved Universal Terrestrial Radio Access (E-UTRA) band 47 C, and each of the two uplink carriers may use 20 MHz bandwidth. Transmission power of the each of the two uplink carriers may be at most 26 dBm. The specific maximum power class for the V2X terminal may be power class 2A.

Figure 11:
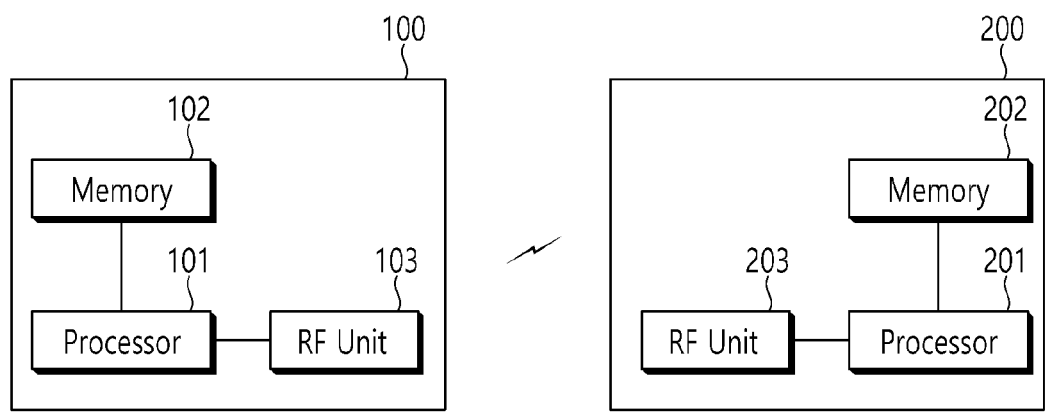
FIG. 11 is a block diagram of a wireless communication system in which the disclosure of the present specification is implemented.

FIG. 11 is a block diagram of a wireless communication system in which the disclosure of the present specification is implemented.

An eNB 200 includes a processor 201, a memory 202, and an RF unit 203. A memory 202 is connected to a processor 201 and saves various information for operating the processor 201. The RF unit 203 is connected to the processor 201 and transmits and/or receives a wireless signal. The processor 201 implements the suggested function, process, and/or method. In the above described embodiments, the operation of the eNB may be implemented by the processor 201.

A UE includes a processor, a memory 102, and an RF unit 103. The memory 102 is connected to the processor 101 and saves various information for operating the processor 101. The RF unit is connected to the processor 101 and transmits and/or receives a wireless signal (especially, V2X signal). The processor 101 implements the suggested function, process, and/or method.

The processor 101 controls the RF unit 103, and determines that a transmission power of the V2X signal does not exceed 33 dBm.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for determining a transmission power of a vehicle-to-everything (V2X) signal, the method performed by a terminal and comprising:
   determining the transmission power of the V2X signal,
   wherein the transmission power is determined based on antenna gain and a conducted power,
   wherein the conducted power is determined to not exceed a specific maximum power class,
   wherein the antenna gain does not exceed 6 dBi, and the specific maximum power class does not exceed 26 dBm,
   wherein the terminal aggregates two uplink carriers, and the two uplink carriers are operated at Evolved Universal Terrestrial Radio Access (E-UTRA) band 47C and each of the two uplink carriers uses 20 MHz bandwidth,
   wherein a transmission power of each of the two uplink carriers does not exceed 26 dBm, and
   wherein the specific maximum power class is power class 2A.

2. The method of claim 1, wherein the transmission power of the V2X signal is defined at E-UTRA band 47.

3. The method of claim 2, wherein the transmission power of the V2X signal does not exceed 33 dBm.

4. The method of claim 3, wherein the specific maximum power class is power class 2.

5. The method of claim 4, wherein the antenna gain is always positive.

6. The method of claim 5, wherein the transmission power of the V2X signal is an Equivalent Isotropic Radiated Power (EIRP) of the terminal.

7. A terminal for supporting vehicle-to-everything (VX2) communication, the terminal comprising:
   a transceiver configured to transmit a V2X signal; and
   a processor configured to determine a transmission power of the V2X signal,
   wherein the transmission power is determined based on antenna gain and a conducted power,
   wherein the conducted power is determined to not exceed a specific maximum power class,
   wherein the antenna gain does not exceed 6 dBi, and the specific maximum power class does not exceed 26 dBm,
   wherein the terminal aggregates two uplink carriers, and the two uplink carriers are operated at Evolved Universal Terrestrial Radio Access (E-UTRA) band 47C and each of the two uplink carriers uses 20 MHz bandwidth,
   wherein a transmission power of each of the two uplink carriers does not exceed 26 dBm, and
   wherein the specific maximum power class is power class 2A.

8. The terminal of claim 7, wherein the transmission power of the V2X signal does not exceed 33 dBm.

9. The terminal of claim 8, wherein the specific maximum power class is power class 2.

* * * * *